(12) United States Patent
Tanaka et al.

(10) Patent No.: US 12,474,075 B2
(45) Date of Patent: Nov. 18, 2025

(54) AIR-CONDITIONING APPARATUS CONTROL DEVICE

(71) Applicant: Mitsubishi Electric Corporation, Tokyo (JP)

(72) Inventors: Ryuta Tanaka, Tokyo (JP); Mio Motodani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 336 days.

(21) Appl. No.: 18/267,107

(22) PCT Filed: Jan. 14, 2021

(86) PCT No.: PCT/JP2021/001012
§ 371 (c)(1),
(2) Date: Jun. 14, 2023

(87) PCT Pub. No.: WO2022/153431
PCT Pub. Date: Jul. 21, 2022

(65) Prior Publication Data
US 2024/0044540 A1  Feb. 8, 2024

(51) Int. Cl.
*F24F 11/63* (2018.01)
*F24F 110/10* (2018.01)
*F24F 120/12* (2018.01)

(52) U.S. Cl.
CPC ........... *F24F 11/63* (2018.01); *F24F 2110/10* (2018.01); *F24F 2120/12* (2018.01)

(58) Field of Classification Search
None
See application file for complete search history.

(56) References Cited

U.S. PATENT DOCUMENTS

2009/0276193 A1   11/2009   Momose et al.
2015/0041550 A1   2/2015    Honda

FOREIGN PATENT DOCUMENTS

EP    2 017 755 A1   1/2009
JP    4016066 B1     12/2007
(Continued)

OTHER PUBLICATIONS

International Search Report and Written Opinion mailed on Mar. 30, 2021, received for PCT Application PCT/JP2021/001012, filed on Jan. 14, 2021, 10 pages including English Translation.
(Continued)

*Primary Examiner* — Sean Shechtman
(74) *Attorney, Agent, or Firm* — XSENSUS LLP

(57) ABSTRACT

An air-conditioning apparatus control device that controls an air-conditioning apparatus and includes an airflow side model construction unit configured to construct an airflow side model, an equipment side model construction unit configured to construct an equipment side model, a coupled optimization execution unit having an objective function calculation unit that calculates a value of an objective function for the air-conditioned space and a sensitivity derivation unit that derives sensitivity, which is change in the objective function when a control variable is changed, and configured to calculate an optimum solution by optimizing the objective function based on the airflow side model and the objective function based on the equipment side model, and a control target value determination unit configured to determine a control target value for the air-conditioning apparatus from the optimum solution.

9 Claims, 14 Drawing Sheets

(56) References Cited

FOREIGN PATENT DOCUMENTS

| | | |
|---|---|---|
| JP | 2012-237484 A | 12/2012 |
| JP | 2015-036589 A | 2/2015 |
| JP | 2016-003827 A | 1/2016 |
| JP | 2017-151617 A | 8/2017 |
| WO | 2018/203368 A1 | 11/2018 |

OTHER PUBLICATIONS

Harayama et al. "Development of Thermal Comfort Control Technology for Indoor Arbitrary Area Based on Distribution Simulation", The Society of Heating, Air-Conditioning Sanitary Engineers of Japan, Sep. 1, 2010, pp. 741-744 (4 pages including English Abstract).

Notice of Reasons for Refusal mailed on Oct. 19, 2021, received for JP Application 2021-532450, 9 pages including English Translation.

Extended European Search Report issued Jan. 15, 2024 in European Patent Application No. 21919325.7, 10 pages.

AIR-CONDITIONING APPARATUS CONTROL DEVICE

CROSS-REFERENCE TO RELATED APPLICATION

The present application is based on PCT filing PCT/JP2021/001012, filed Jan. 14, 2021, the entire contents of which are incorporated herein by reference.

TECHNICAL FIELD

The present technology relates to an air-conditioning apparatus control device, and, in particular, relates to control of a heating energy environment in an air-conditioned space in which an air-conditioning apparatus performs air conditioning.

BACKGROUND ART

Hitherto, there have been proposed techniques for controlling a heating energy environment of a desired location within a space by using a thermal fluid analysis and an inverse analysis (see, for example, Non Patent Literature 1). In this technique, by using a thermal fluid analysis model for a space to be air-conditioned (hereinafter referred to as an air-conditioned space), a simulation of the air-conditioned space and an inverse analysis of the air-conditioned space based on the simulation result are performed to estimate control parameters. By controlling devices in the air-conditioning apparatus by using the estimated control parameters, a desired heating energy environment can be attained at a desired location.

Normally, an air-conditioning apparatus is generally provided with at least one temperature sensor for detecting temperature, An air-conditioning apparatus control device for controlling an air-conditioning apparatus is configured to control the air-conditioning apparatus by a prescribed method such that a temperature to be detected by the temperature sensor approaches a control target value, such as a set temperature, to thereby control a heating energy environment in the air-conditioned space. In this case, the temperature to be detected by the temperature sensor is the temperature of a local space around the position at which the temperature sensor is installed, and does not necessarily reflect the temperature of the air-conditioned space. For this reason, a control method for obtaining a desired heating energy environment has been proposed (see, for example, Patent Literature 1). In this method, the air-conditioning apparatus control device grasps boundary condition temperatures in the air-conditioned space and a heating energy environment itself in the air-conditioned space by simulation. Then, the air-conditioning apparatus control device performs an inverse analysis by using the simulation result to obtain a required air outlet temperature.

CITATION LIST

Patent Literature

Patent Literature 1: Japanese Unexamined Patent Application Publication No. 2015-36589.

Non Patent Literature

Non Patent Literature 1: Kazuya HARAYAMA, Mitsuhiro HONDA, and Choseihara KASEDA, "Development of Thermal Comfort Control Technology for Indoor Arbitrary Area Based on Distribution Simulation", 2010 Conference, I-20, The Society of Heating, Air-Conditioning, and Sanitary Engineers of Japan, Sep. 1, 2010

SUMMARY OF INVENTION

Technical Problem

However, when the air-conditioning apparatus control device performs the above-mentioned control method, conditions on the equipment side of the air-conditioning apparatus are not considered. Consequently, there is a problem that an actual control of the air-conditioning apparatus becomes insufficient in some cases.

The present disclosure has been made to solve the problem described above, and has an object to provide an air-conditioning apparatus control device capable of efficiently controlling an air-conditioning apparatus.

Solution to Problem

An air-conditioning apparatus control device according to an embodiment of the present disclosure controls an air-conditioning apparatus performing air conditioning in an air-conditioned space. The air-conditioning apparatus control device includes an airflow side model construction unit configured to construct an airflow side model for simulating a heating energy environment in the air-conditioned space, an equipment side model construction unit configured to construct an equipment side model for simulating a restriction of behavior of a device that the air-conditioning apparatus has and for simulating a capacity of the device, a coupled optimization execution unit having an objective function calculation unit that calculates a value of an objective function for the air-conditioned space and a sensitivity derivation unit that derives sensitivity, which is change in the objective function when a control variable is changed, and configured to calculate an optimum solution by optimizing the objective function based on the airflow side model and the objective function based on the equipment side model by using an inverse analysis method, and a control target value determination unit configured to determine a control target value for the air-conditioning apparatus from the optimum solution.

Advantageous Effects of Invention

According to an embodiment of the present disclosure, the airflow side model construction unit and the equipment side model construction unit are provided, and the coupled optimization execution unit calculates an optimum solution by taking not only the airflow side objective function but also a constraint in an equipment side objective function into consideration. As a result, conditions for a comfortable and energy-saving operation can be obtained for the air-conditioning apparatus.

DESCRIPTION OF EMBODIMENTS

Figure 1:
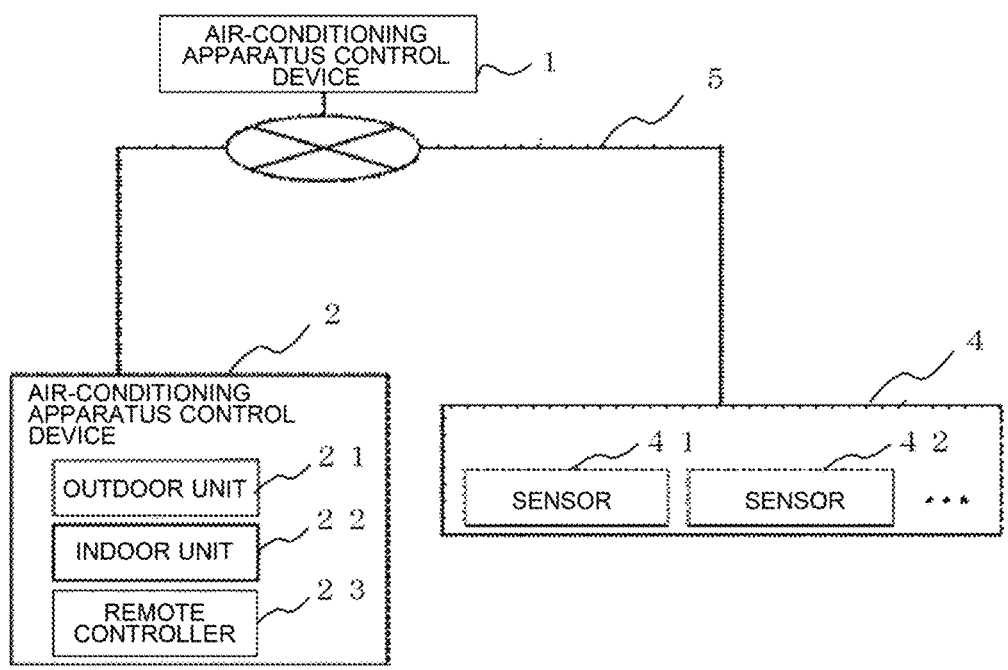
FIG. 1 is a diagram illustrating an example of the configuration of an air-conditioning system including an air-conditioning apparatus control device 1 according to Embodiment 1.

Embodiments of an air-conditioning apparatus control device will be described below with reference to the drawings. Note that the drawings regarding the description below are illustrated schematically, and, for the sake of convenience of description, omission or simplification of configurations may be made, as appropriate, in the drawings. Furthermore, in the drawings, components which are denoted by the same reference symbols are the same or corresponding components, and this applies to the entire description of embodiments described below. In addition, modes of components in the description are mere examples, and the modes are not limited to those given in the description. In particular, combinations of components are not limited to the combinations in the embodiments, and a component described in one embodiment may be applied to another embodiment. Moreover, with regard to a plurality of devices of the same type which are distinguished by suffixes, in a case where the devices are not particularly required to be distinguished or specified, the suffixes may be omitted in some cases.

Embodiment 1

FIG. 1 is a diagram illustrating an example of the configuration of an air-conditioning system including an air-conditioning apparatus control device 1 according to Embodiment 1. The air-conditioning apparatus control device 1 is configured to control operations of an air-conditioning apparatus 2. Via a control network 5, the air-conditioning apparatus control device 1 is connected to the air-conditioning apparatus 2 and a sensor unit 4 such that the air-conditioning apparatus control device 1 can communicate with them. The air-conditioning apparatus 2 includes an outdoor unit 21, an indoor unit 22, and a remote controller 23 as components. The outdoor unit 21 is configured to cool or heat a heat refrigerant, such as refrigerant or water. The indoor unit 22 is configured to exchange heat between air in the air-conditioned space, such as an indoor space, and the heat refrigerant to heat or cool the air in the air-conditioned space, thereby controlling the temperature in the air-conditioned space. The remote controller 23 is a device that an occupant uses when turning on/off the indoor unit 22, or manually changing a setting, such as setting temperature, air volume, or airflow direction.

Figure 2:
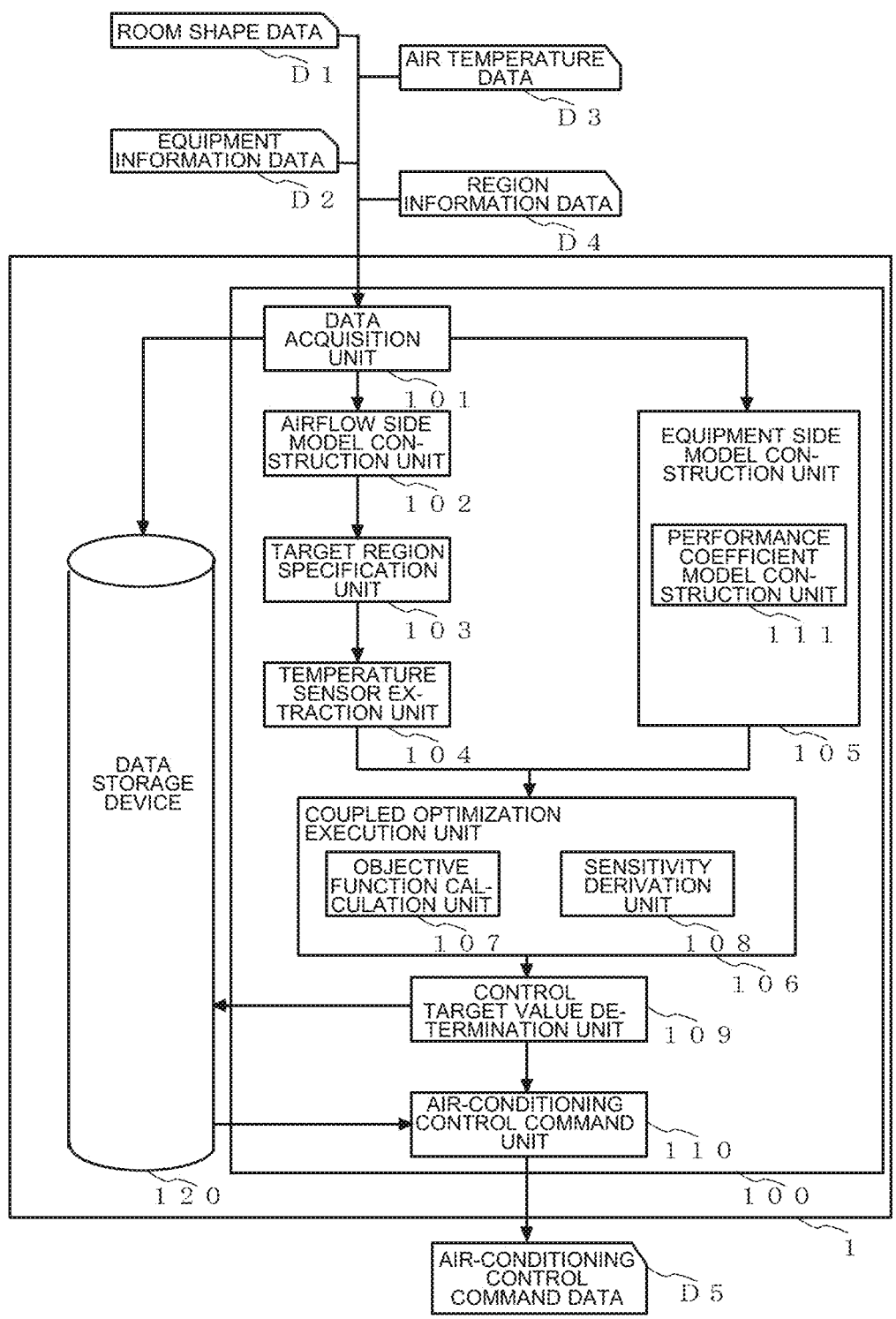
FIG. 2 is a diagram illustrating an example of the configuration of the air-conditioning apparatus control device 1 according to Embodiment 1.

The sensor unit 4 is a group of sensors detecting and measuring physical quantities. In this case, the sensor unit 4 detects various physical quantities related to environment conditions inside and outside the air-conditioned space, such as temperature and pressure. In FIG. 2, a sensor 41 and a sensor 42 are provided as the sensor unit. Here, a case where multiple temperature sensors are installed mainly inside the air-conditioned space is explained. The control network 5 is an electric communication line connecting the air-conditioning apparatus control device 1, the air-conditioning apparatus 2, and the sensor unit 4.

FIG. 2 is a diagram illustrating an example of the configuration of the air-conditioning apparatus control device 1 according to Embodiment 1. FIG. 2 also shows data to be input to and output from the air-conditioning apparatus control device 1. The air-conditioning apparatus control device 1 has a control processor 100 and a data storage device 120.

In this case, the control processor 100 is, for example, a device that performs control arithmetic processing, such as a computer having a central processing unit (CPU) as a main component. A sequence of processing to be performed by each unit, which will be described later, is programmed in advance. The control processor 100 is configured to execute the program to achieve the processing. However, the control processor 100 is not limited to this configuration. Each unit of the control processor 100 may be formed by a dedicated device (hardware).

The data storage device 120 is a device that stores data necessary for the control processor 100 to perform processing. In particular, the data storage device 120 of Embodiment 1 is configured to store various data obtained by a data acquisition unit 101, which will be described later. In addition, the data storage device 120 in Embodiment 1 stores data in which a sequence of processing to be performed by each unit of the control processor 100 is programmed, as described above. The data storage device 120 includes a volatile storage device (not shown), such as a random access memory (RAM), which can temporarily store data, a solid state disk, and a non-volatile auxiliary storage device (not shown), such as a flash memory, which can store data for a long period.

The control processor 100 of Embodiment 1 includes the data acquisition unit 101, an airflow side model construction unit 102, a target region specification unit 103, a temperature sensor extraction unit 104, an equipment side model construction unit 105, a coupled optimization execution unit 106, a control target value determination unit 109, and an air-conditioning control command unit 110.

The data acquisition unit 101 is configured to receive signals from the sensor unit 4 and external devices to obtain various data included in the signals. In this case, the data acquisition unit 101 is configured to obtain room shape data D1, equipment information data D2, air temperature data D3, and region information data D4. The data acquisition unit 101 stores obtained data in the data storage device 120. The room shape data D1 is data on the dimension of the air-conditioned space, such as the width, depth, and height of the inside of the room. The equipment information data D2 is, for example, data on the devices that the air-conditioning apparatus 2 has, including the configuration of a refrigerant circuit, the rated capacity of a device, and the specification of a drive system device. The air temperature data D3 is data on various air temperatures of the air-conditioned space sent from the sensor unit 4. The region information data D4 is data of information on regions of occupancy area in the air-conditioned space.

The airflow side model construction unit 102 is configured to perform processing for constructing an airflow side model regarding airflows, in which geometric configuration of the air-conditioned space is reflected. The geometric configuration is obtained from the room shape data D1 obtained by the data acquisition unit 101. In the model constructed by the airflow side model construction unit 102, the target region specification unit 103 is configured to perform processing for specifying a region to be air-conditioned as an air-conditioned region based on the region information data D4. The temperature sensor extraction unit 104 is configure to perform processing for extracting a temperature sensor positioned near the air-conditioned region as a detection target from the sensor unit 4 that the air-conditioning apparatus 2 has.

Figure 3:
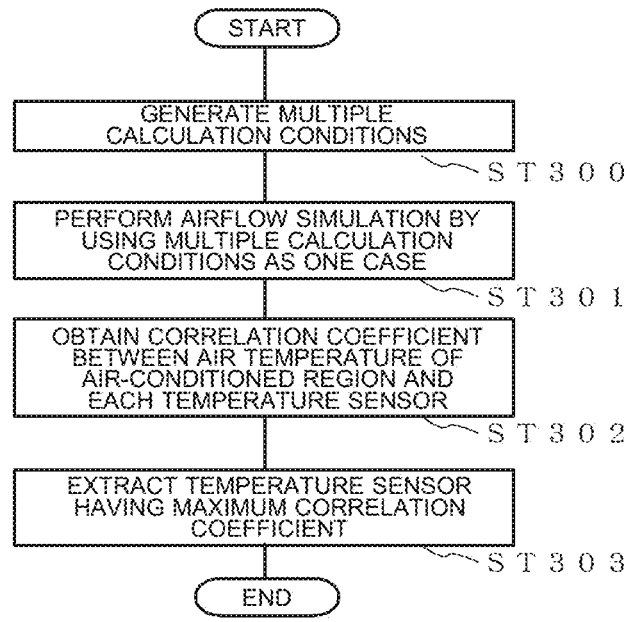
FIG. 3 is a diagram explaining an example of processing of a temperature sensor extraction unit 104 according to Embodiment 1.

FIG. 3 is a diagram explaining an example of processing of the temperature sensor extraction unit 104 according to Embodiment 1. FIG. 3 shows a flowchart that the temperature sensor extraction unit 104 executes. First, in step ST300, the temperature sensor extraction unit 104 generates a plurality of calculation conditions for calculating a heating energy environment by varying the calculation conditions. Next, in step ST301, the temperature sensor extraction unit 104 performs an airflow simulation as one case by using the generated calculation conditions. Then, in step ST302, the temperature sensor extraction unit 104 obtains a correlation coefficient between the air temperature of the region in the simulation result and the temperature detected by each of the temperature sensors in the air-conditioned space. Finally, in step ST303, the temperature sensor extraction unit 104 extracts the temperature sensor having the maximum correlation coefficient as the temperature sensor that is used in a feedback control and in which the heating energy environment of the air-conditioned region is reflected.

The equipment side model construction unit 105 is configured to construct an equipment side model in which restrictions and capacities of devices of the air-conditioning apparatus 2 are simulated, by using the equipment information data D2. The equipment side model construction unit 105 has, for example, a performance coefficient model construction unit 111.

The performance coefficient model construction unit 111 is configured to construct a performance coefficient model as the equipment side model of the air-conditioning apparatus 2. The performance coefficient model represents a coefficient of performance and is constructed as a function of control variables. The performance coefficient model as a function of control variables is represented by formula (1), for example. Formula (1) is a definition formula of the coefficient of performance. In Formula (1), COP is the coefficient of performance. $V_{inlet}$ is the velocity of air supplied from an air outlet of the indoor unit 22 of the air-conditioning apparatus 2 to the air-conditioned space. $T_{inlet}$ is the temperature of air supplied from the air outlet to the air-conditioned space.

[Formula 1]

$$COP = f_{RAC}(V_{inlet}, T_{inlet}) \qquad \text{[Formula 1]}$$

The coupled optimization execution unit 106 is configured to execute optimization using an inverse analysis method by using the airflow side model constructed by the airflow side model construction unit 102 and the equipment side model constructed by the equipment side model construction unit 105. The coupled optimization execution unit 106 has an objective function calculation unit 107 and a sensitivity derivation unit 108. An optimization problem can be expressed as, for example, a minimization problem as follows. Formula (2) represents a formulated minimization problem. In Formula (2), J is an objective function. W is a state variable vector, such as flow velocity or temperature. U is a control variable vector, such as air velocity or temperature at the air outlet. R is a constraint equation in the minimization problem, such as an incompressible Navier-Stokes equation or an energy equation.

[Formula 2]

$$\text{minimize } \mathcal{J} = \mathcal{J}(\mathcal{W}, \mathcal{U}) \qquad (2)$$

$$\text{s.t. } \mathcal{R}(\mathcal{W}, \mathcal{U}) = 0,$$

The coupled optimization execution unit 106 is configured to execute a simulation (hereinafter referred to as computational fluid dynamics [CFD] simulation) using CFD by using the airflow side model constructed by the airflow side model construction unit 102. The CFD is a method that discretizes the air-conditioned space into grid cells and solves governing equations for each grid cell. The governing equations for fluid used in the CFD simulation are, for example, as follows. Formula (3) is a continuity equation representing the conservation of mass for fluid. Formula (4) is an incompressible Navier-Stokes equation representing the conservation of momentum. Formula (5) is an energy equation. The coupled optimization execution unit 106 calculates the temperature and the air velocity for each divided region by solving these formulas with appropriate initial values under appropriate boundary conditions.

[Formula 3]

$$\nabla \cdot u = 0 \quad (3)$$

[Formula 4]

$$\rho\left(\frac{\partial u}{\partial t} + (u \cdot \nabla u)\right) = -\nabla p + \nabla \cdot (\mu \nabla u) + (\rho - \rho_0)g \quad (4)$$

[Formula 5]

$$C_p\left(\frac{\partial T}{\partial t} + u \cdot \nabla T\right) = \nabla \cdot (k \nabla T) + Q \quad (5)$$

In Formulas (3) to (5), u is a three-dimensional velocity vector, t is a time, p is a pressure, $\rho$ is a density, $\mu$ is a viscosity coefficient, $\rho_0$ is a standard density, g is a gravity acceleration, $C_p$ is a constant pressure specific heat, T is a temperature, k is a thermal conductivity, and Q is an internal heat generation. The above-mentioned technique is called a forward analysis because the temperature and the air velocity of each region in the air-conditioned space are simulated according to a cause-and-effect relationship by using given initial values under given boundary conditions. On the other hand, in optimization using an inverse analysis method, the temperature and the air velocity of each region in the air-conditioned space are specified in an airflow simulation using the CFD, and an initial value and a boundary condition are obtained by inverting a cause-and-effect relationship. Such a method is called inverse analysis because a cause-and-effect relationship is inverted.

The coupled optimization execution unit 106 is configured to also execute a simulation for equipment side by using the equipment side model constructed by the equipment side model construction unit 105. Thus, the behavior of the equipment side can be taken into consideration. At that time, by using the equipment side model, the coupled optimization execution unit 106 calculates an air inlet temperature from the CFD simulation result and simulates behavior of a drive system device, such as a compressor provided in the air-conditioning apparatus 2, included in the refrigerant circuit. Therefore, the coupled optimization execution unit 106 can calculate a power consumption amount as an objective function for power consumption amount, which will be described later. However, this method takes time to simulate the behavior of the equipment side. For this reason, the equipment side simulation includes a simulation method using a simplified equipment side model, in which only an air outlet air velocity and an air outlet temperature are used, as expressed in Formula (1).

The objective function calculation unit 107 is configured to calculate a value of a prescribed objective function from the result of CFD simulation using the airflow side model, which is constructed by the airflow side model construction unit 102, and the result of equipment simulation using the equipment side model, which is constructed by the equipment side model construction unit 105. The prescribed objective function is, for example, as follows. Formula (6) is an equation for calculating an objective function. Here, $J_{opt}$ is an objective function. $J_1$ is an objective function regarding heating energy environment in the air-conditioned space (hereinafter referred to as heating energy environment objective function). $J_2$ is an objective function regarding power consumption amount of the air-conditioning apparatus 2 (hereinafter referred to as power objective function). $\omega$ is a coefficient for adjusting balance between the magnitude of the heating energy environment objective function $J_1$ and that of the power objective function $J_2$. With Formula (6), the objective function regarding the airflow side and the objective function regarding the equipment side can be optimized at the same time.

[Formula 6]

$$J_{opt} = J_1 + \omega \times J_2 \quad (6)$$

As the coefficient $\omega$, the objective function calculation unit 107 of Embodiment 1 uses a prescribed value for specifying degrees of influence of the heating energy environment objective function $J_1$ and the power objective function $J_2$ in the optimum solution. In this case, multiple coefficients $\omega$ may be used according to the preference of an occupant in the room or the operation state of the air-conditioning apparatus 2.

Formula (7) is a definition formula of the heating energy environment objective function $J_1$. u is a velocity of air and $u_d$ is a target velocity of air. T is an air temperature and $T_d$ is a target air temperature. D is the air-conditioned region specified by the target region specification unit 103. Thus, Formula (7) is a formula for performing a volume integral for only state variables in the air-conditioned region in the air-conditioned space. In addition, a coefficient $\alpha$ and a coefficient $\beta$ are coefficients for weighting the term of air velocity and the term of temperature. These coefficients also specify the degrees of influence of the first term and the second term of Formula (7). Thus, prescribed values are used as the coefficient $\alpha$ and a coefficient $\beta$. Furthermore, multiple coefficients $\alpha$ and multiple coefficients $\beta$ may be used according to the preference of an occupant in the room or the operation state of the air-conditioning apparatus 2.

[Formula 7]

$$J_1 = \alpha \times \int_D (u - u_d)^2 dV + \beta \times \int_D (T - T_d)^2 dV \quad (7)$$

Formula (8) is an example of a definition formula of the power objective function $J_2$. Here, $Q_{RAC}$ represents an air-conditioning capacity. In this manner, the objective function simulating the behavior of the equipment side is set.

[Formula 8]

$$J_s = \frac{Q_{RAC}}{COP} \quad (8)$$

Formula (9) is a definition formula for $Q_{RAC}$. $\rho$ is an air density and C is a constant pressure specific heat. $V_i$ is an air velocity at the ith air outlet of the air-conditioning apparatus and $A_i$ is an area of the ith air outlet. $T_{i,inlet}$ is a temperature at the ith air outlet of the air-conditioning apparatus and $T_{i,outlet}$ is a temperature at the ith air inlet of the air-conditioning apparatus. By setting the power objective function $J_2$ in this manner, the behavior of the equipment of the air-conditioning apparatus 2 can be directly obtained by using the variables used in calculation of CFD in the airflow side model together with the performance coefficient model, without using a variable describing the behavior of an actuator in the equipment, such as the frequency of a compressor. Therefore, even in a method using an adjoint variable method, which will be described later, the performance and restrictions of the equipment side can be handled in the same way as the conditions of the airflow side, and thus a high speed calculation can be attained.

[Formula 9]

$$Q_{RAC} = \sum_{i=1}^{n} \rho C V_i A_i (T_{i,inlet} - T_{i,outlet}) \quad (9)$$

The sensitivity derivation unit 108 is configured to derive sensitivities each indicating influence of change in a control variable on an objective function by using the objective function value derived by the objective function calculation unit 107. The sensitivities are, for example, as follows. Formula (10) is a definition formula for the sensitivity in the air outlet velocity, and Formula (11) is a definition formula for the sensitivity in the air outlet temperature. $V_{in}$ is an air outlet velocity and $T_{in}$ is an air outlet temperature, and they are control variables. $\delta V_{in}$ and $\delta T_{in}$ are infinitesimal amounts of change in $V_{in}$ and $T_{in}$, respectively.

[Formula 10]

$$\nabla_{V_{in}} J = \frac{J(V_{in} + \delta V_{in}) - J(V_{in} - \delta V_{in})}{2\delta V_{in}} \quad (10)$$

[Formula 11]

$$\nabla_{T_{in}} J = \frac{J(T_{in} + \delta T_{in}) - J(T_{in} - \delta T_{in})}{2\delta T_{in}} \quad (11)$$

Figure 4:
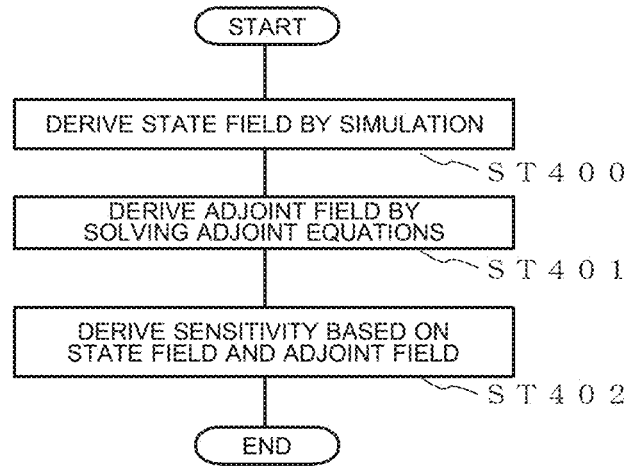
FIG. 4 is a diagram explaining an example of processing of a sensitivity derivation unit 108 according to Embodiment 1.

FIG. 4 is a diagram explaining an example of processing of the sensitivity derivation unit 108 according to Embodiment 1. FIG. 4 shows a flowchart regarding the processing in which the sensitivity derivation unit 108 uses an adjoint equation. First, in step ST400, the sensitivity derivation unit 108 performs a forward analysis in the airflow simulation to derive a state field. Next, in step ST401, the sensitivity derivation unit 108 solves adjoint equations by using the state field to derive an adjoint field. Then, in step ST402, the sensitivity derivation unit 108 derives a sensitivity based on the state field and the adjoint field. Formula (12) is an example of the adjoint equations. In this formula, $V_a$ is an adjoint velocity, $T_a$ is an adjoint temperature, and $p_a$ is an adjoint pressure. They are called adjoint fields, and correspond to the velocity V, the temperature T, and the pressure p, which are state fields.

[Formula 12]

$$\nabla \cdot (V)_a = 0, \quad (12)$$

$$-(V \cdot \nabla)V_n + \nabla V^T \cdot V_a + \nabla p_a + T_a \nabla \theta - \frac{1}{Re} \nabla^2 V_a + \frac{\partial \mathcal{L}}{\partial V} = 0,$$

$$RiV_a \cdot \hat{y} - V \cdot \nabla T_a - \frac{1}{Pe} \nabla^2 T_a + \frac{\partial \mathcal{L}}{\partial \theta} = 0,$$

Formula (13) is a formula representing an example of sensitivity derived by using an adjoint field and a state field.

[Formula 13]

$$\frac{\partial \mathcal{L}}{\partial V_{in}} = p_{a,in} n - \frac{1}{Re}(n \cdot \nabla)V_{a,in} \quad (13)$$

$$\frac{\partial \mathcal{L}}{\partial \theta_{in}} = \frac{1}{Pe}(n \cdot \nabla)T_{a,in}$$

Figure 5:
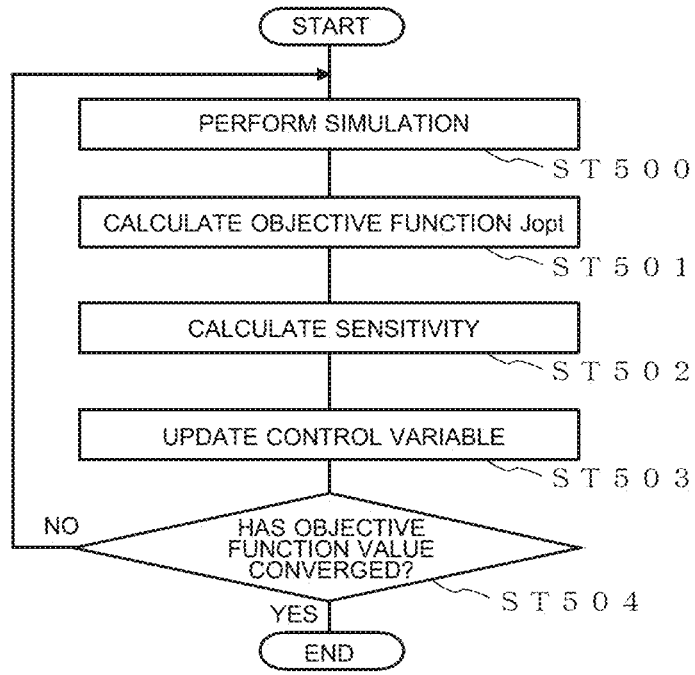
FIG. 5 is a diagram explaining an example of processing of a coupled optimization execution unit 106 according to Embodiment 1.

FIG. 5 is a diagram explaining an example of processing of the coupled optimization execution unit 106 according to Embodiment 1. First, in step ST500, the coupled optimization execution unit 106 performs simulation using the airflow side model constructed by the airflow side model construction unit 102 and the equipment side model constructed by the equipment side model construction unit 105. In step ST501, the objective function calculation unit 107 derives an objective function value of a prescribed objective function. In step ST502, the sensitivity derivation unit 108 derives sensitivity. In step ST503, the coupled optimization execution unit 106 updates a control variable by using the derived sensitivity. Here, Formula (14) is an example of an update formula for a control variable. In Formula (14), $x_k$ is a control variable vector before update and $x_{k+1}$ is a control variable vector after update. In addition, $\alpha_k$ is a sensitivity vector and $d_k$ is an update width of the control variable. Formula (14) is an update method using a steepest descent method in which the sensitivity derived by the sensitivity derivation unit 108 is used. However, the update method is not limited thereto, and may be a method, such as a quasi-Newton's method, in which data on sensitivity is used just as with the update method described above to improve the convergence of calculation.

[Formula 14]

$$x_{k+1} = x_k + \alpha_k d_k \quad (14)$$

Then, in step ST504, the coupled optimization execution unit 106 performs convergence determination processing. When the coupled optimization execution unit 106 determines that the objective function value has converged, the coupled optimization execution unit 106 considers that an optimum value for the control variable is calculated and thus ends the processing. Formula (15) and Formula (16) are examples of formulas for convergence determination. $J_k$ is an objective function value at the kth iteration. $\varepsilon$ is a minute value for convergence determination. $\nabla J_k$ is a sensitivity at the kth iteration. When the coupled optimization execution unit 106 determines that the objective function value has not converged yet, the coupled optimization execution unit 106 returns the processing to step ST500 to continue the processing.

[Formula 15]

$$|J_{k+1} - J_k| > \varepsilon \quad (15)$$

[Formula 16]

$$\nabla J_k > \varepsilon \quad (16)$$

In a temperature distribution in the air-conditioned space realized by the optimum value of the control variable derived by the coupled optimization execution unit 106, the control target value determination unit 109 determines the temperature at the position of the sensor extracted by the temperature sensor extraction unit 104 as a control target value. Then, the control target value determination unit 109 stores the determined control target value as data in the data storage device 129. The control target value derived by the control target value determination unit 109 is used as a target in a feedback control. The air-conditioning control command unit 110 outputs a signal including air-conditioning control command data D5 used in the feedback control.

Figure 6:
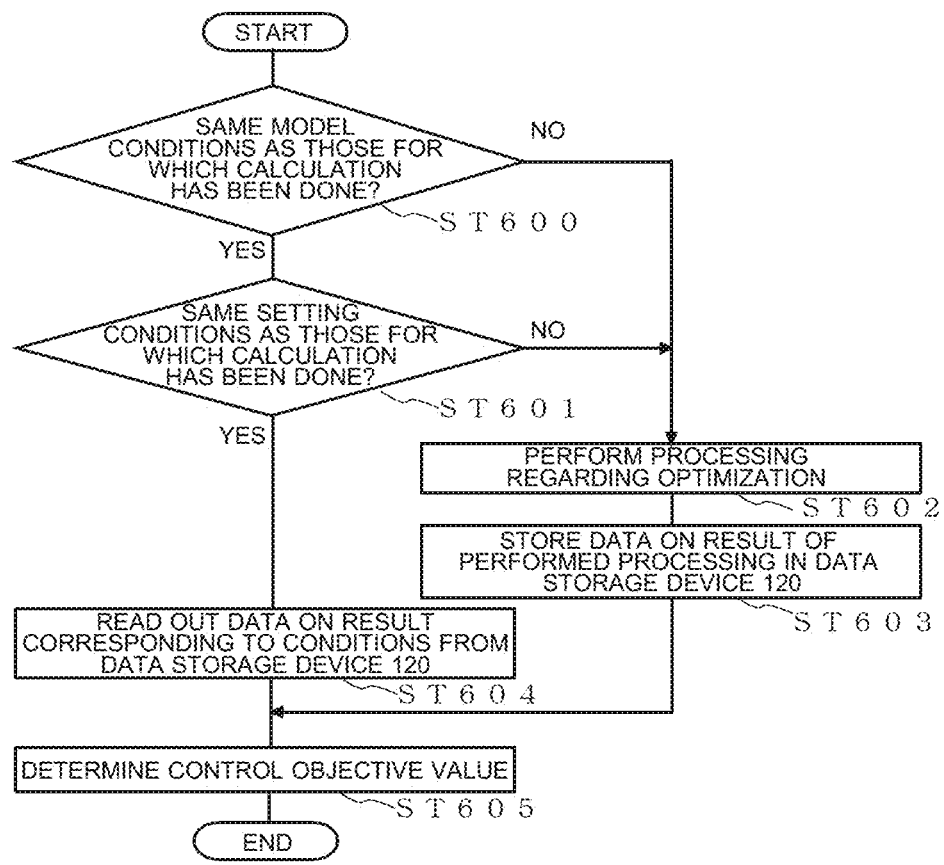
FIG. 6 is a diagram explaining an example of processing performed by the coupled optimization execution unit 106 and a control target value determination unit 109 according to Embodiment 1.

FIG. 6 is a diagram explaining an example of processing performed by the coupled optimization execution unit 106 and the control target value determination unit 109 according to Embodiment 1. First, in step ST600, the coupled optimization execution unit 106 determines whether the airflow side model constructed by the airflow side model construction unit 102 and the equipment side model constructed by the equipment side model construction unit 105 are the same as the model conditions for which calculation has been executed already. Then, in step ST601, the coupled optimization execution unit 106 determines whether a boundary condition of the airflow side model and a setting condition, such as a setting temperature, of the equipment side model are the same as the results of calculation being executed already.

When the coupled optimization execution unit 106 determines that both of two conditions are satisfied, the control target value determination unit 109 reads out data on the result of optimization corresponding to the two conditions from the data stored in the data storage device 120 in step ST604. Then, in step ST605, the control target value determination unit 109 determines a control target value.

Meanwhile, when the coupled optimization execution unit 106 determines that either of two conditions is not satisfied in step ST600 or step ST601, the coupled optimization execution unit 106 performs the processing regarding optimization, as described above, in step ST602. Then, in step ST603, the coupled optimization execution unit 106 stores and saves data on the result of optimization, such as an optimum value of a control variable, in the data storage device 120. Then, in step ST605, the control target value determination unit 109 determines a control target value from the calculation results stored in the data storage device 120.

Advantageous Effects of Embodiment 1

As described above, according to Embodiment 1, the air-conditioning apparatus control device 1 includes the equipment side model construction unit 105. The equipment side model construction unit 105 constructs an equipment side model. Then, the coupled optimization execution unit 106 can obtain conditions for a comfortable and energy-saving operation by taking not only restrictions on the airflow side but also restrictions on the equipment side into consideration. The air-conditioning apparatus 2 can thus be controlled according to the operational conditions. At this time, the target region specification unit 103 specifies an air-conditioned region within the air-conditioned space. Therefore, an optimum solution can be obtained such that no energy is spent for air conditioning a region where air conditioning is not needed.

Furthermore, a temperature sensor in which the temperature of the air-conditioned region is to be reflected is extracted from the sensor unit 4 associated with the air-conditioning apparatus 2. Therefore, a feedback control can be performed for the air-conditioned region, and thus the air-conditioned region can be maintained at a desired temperature. In addition, the data storage device 120 is configured to store and save, as data, the result of conditions for which processing has been executed already. Thus, when the same conditions are used, the control target value determination unit 109 can determine a control target value based on the data saved in the data storage device 120, and thus a faster response can be achieved.

Embodiment 2

Figure 7:
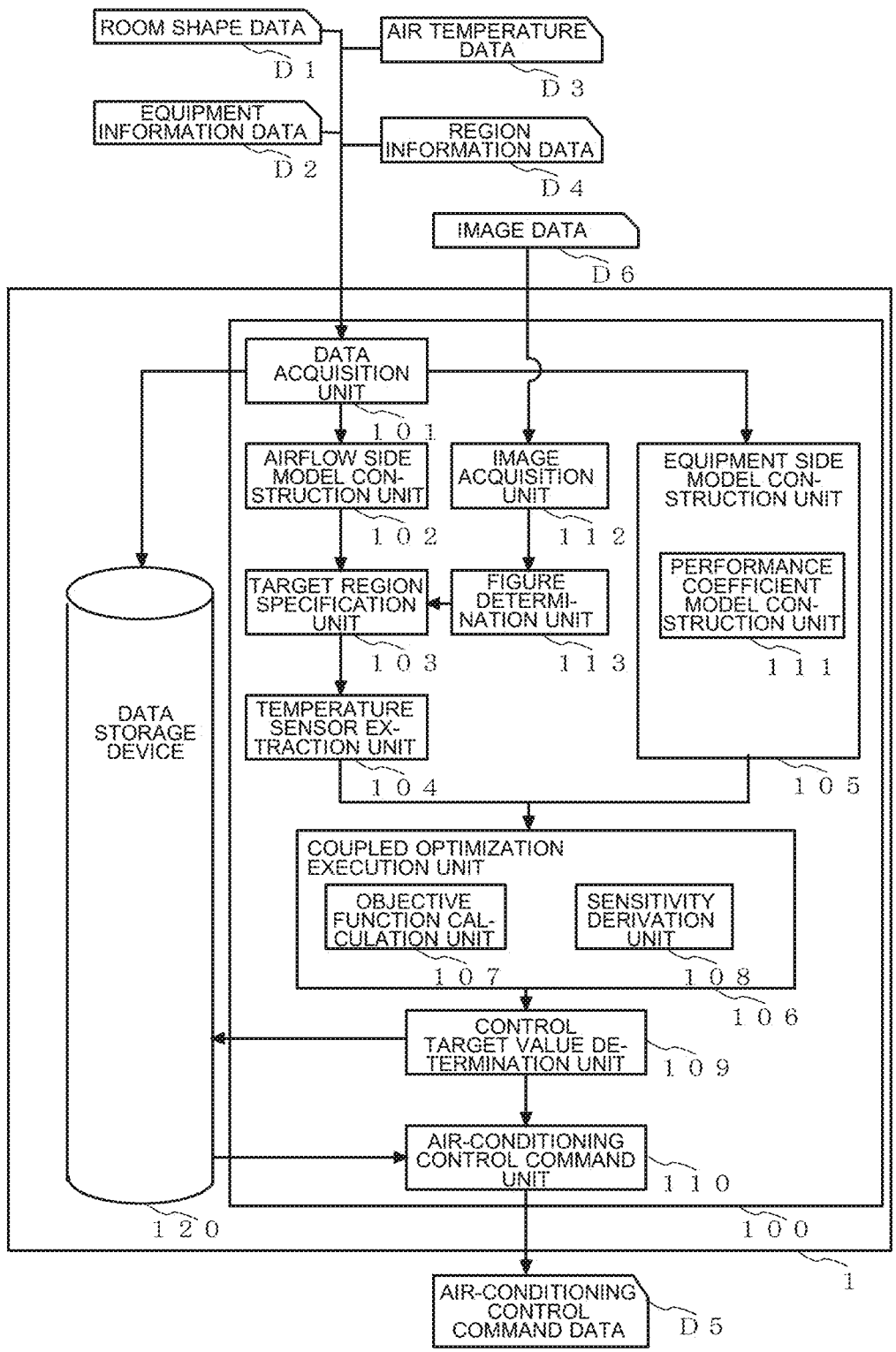
FIG. 7 is a diagram illustrating an example of the configuration of the air-conditioning apparatus control device 1 according to Embodiment 2.

FIG. 7 is a diagram illustrating an example of the configuration of the air-conditioning apparatus control device 1 according to Embodiment 2. A device in FIG. 7 denoted by the same reference sign as that in FIG. 2 performs the same processing as described in Embodiment 1. The air-conditioning apparatus control device 1 of Embodiment 2 includes an image acquisition unit 112 and a figure determination unit 113. The image acquisition unit 112 is configured to obtain image data D6 of the air-conditioned space captured by an imaging sensor H101, which will be described later. The figure determination unit 113 is configured to perform processing on the image data D6 according to a certain algorithm to determine whether or not a human figure is present.

Figure 8:
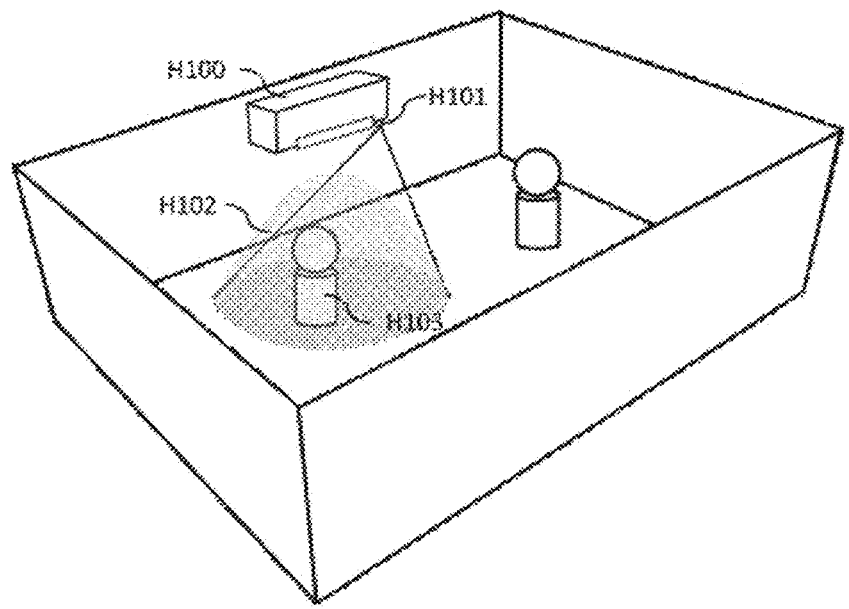
FIG. 8 is a schematic diagram explaining acquisition of data on an air-conditioned region according to Embodiment 2.

FIG. 8 is a schematic diagram explaining acquisition of data on the air-conditioned region according to Embodiment 2. In FIG. 8, H100 is the indoor unit 22 described in Embodiment 1. H101 is an imaging sensor, such as an infrared sensor or an image sensor, provided in the indoor unit 22. In this case, the imaging sensor H101 may be a thermal image sensor. H102 is an air-conditioned region including the position of a human figure. H103 is an occupant staying in the air-conditioned region.

Figure 9:
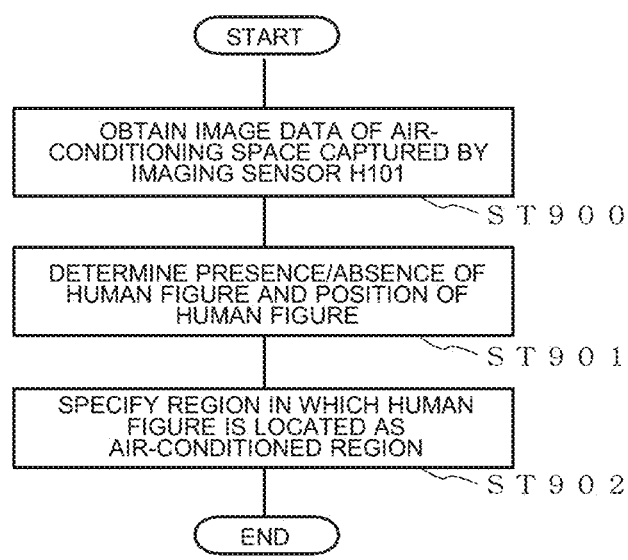
FIG. 9 is a diagram explaining processing performed by the air-conditioning apparatus control device 1 according to Embodiment 2.

FIG. 9 is a diagram explaining processing performed by the air-conditioning apparatus control device 1 according to Embodiment 2. First, in step ST900, the image acquisition unit 112 obtains image data D6 on the air-conditioned space that the imaging sensor H101 of the indoor unit 22 captured. Next, in step ST901, the figure determination unit 113 determines the presence/absence of a human figure and the position of the human figure from the image data D6 obtained by the image acquisition unit 112. Then, in step ST902, the target region specification unit 103 specifies the region that includes the positon of the human figure determined by the figure determination unit 113 as the air-conditioned region.

Advantageous Effects of Embodiment 2

As described above, according to the air-conditioning apparatus control device 1 of Embodiment 2, the figure determination unit 113 determines the position of a human figure from the image data D6 obtained by the image acquisition unit 112. The target region specification unit 103 specifies the air-conditioned region based on the determined position of the human figure. As a result, the air-conditioning apparatus 2 can supply air-conditioned air to the occupant in the air-conditioned space in a more accurate manner. Thus, comfortableness of the occupant can be improved.

Embodiment 3

Figure 10:
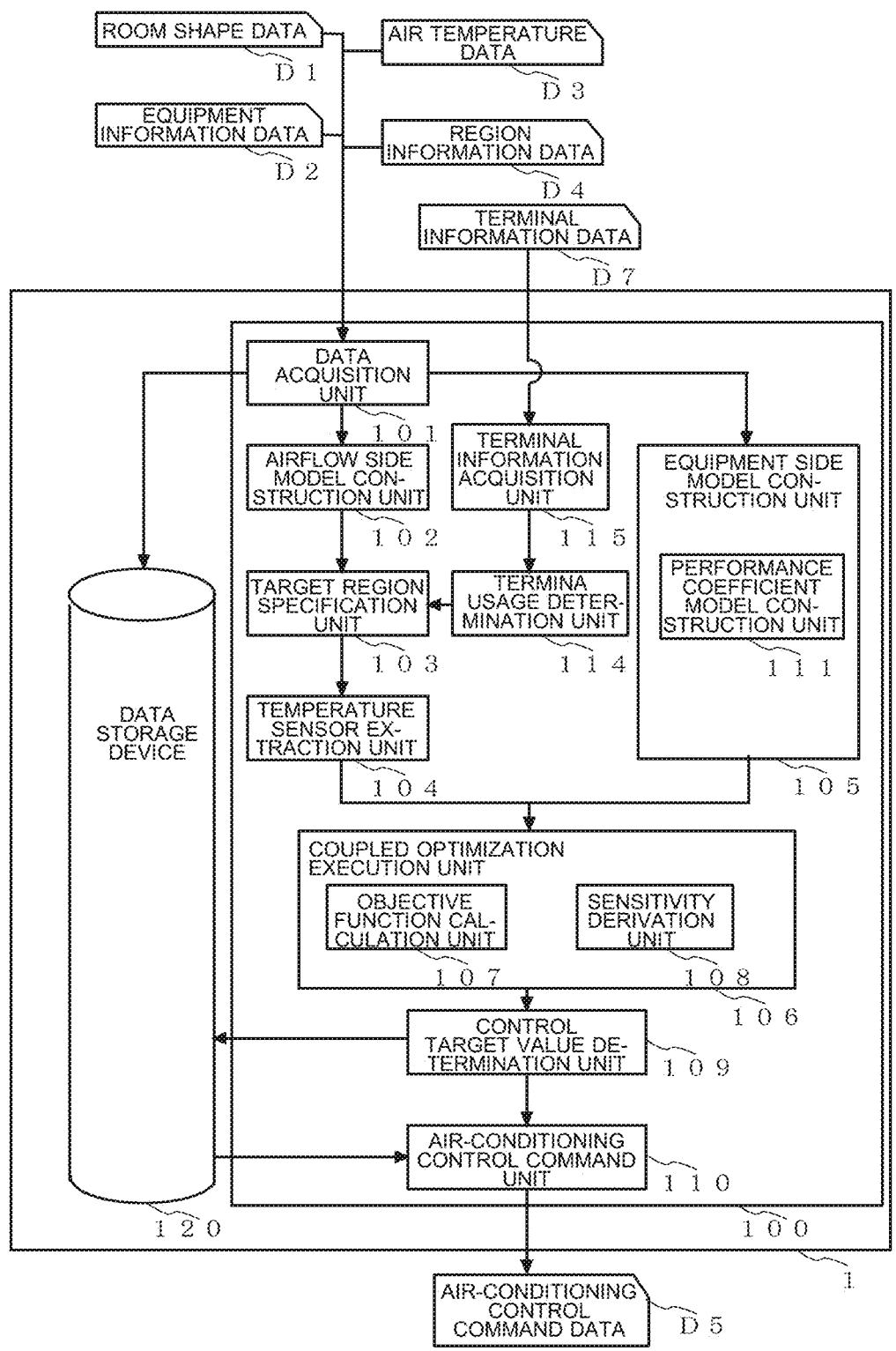
FIG. 10 is a diagram illustrating an example of the configuration of the air-conditioning apparatus control device 1 according to Embodiment 3.

FIG. 10 is a diagram illustrating an example of the configuration of the air-conditioning apparatus control device 1 according to Embodiment 3. A device in FIG. denoted by the same reference sign as that in FIG. 2 performs the same processing as described in Embodiment 1. The air-conditioning apparatus control device 1 of Embodiment 3 includes a terminal information acquisition unit 115 and a terminal usage determination unit 114. The terminal information acquisition unit 115 is configured to obtain data D7 of terminal information, which indicates the position of a terminal device owned by an occupant H203, which will be described later, such as a wearable terminal device H204 or a mobile terminal device H304, which will be described later. The data on the position of the terminal device is sent from the air-conditioning apparatus 2. In addition, the terminal usage determination unit 114 is configured to perform processing according to a certain algorithm to determine whether or not the occupant is using the terminal device.

Figure 11:
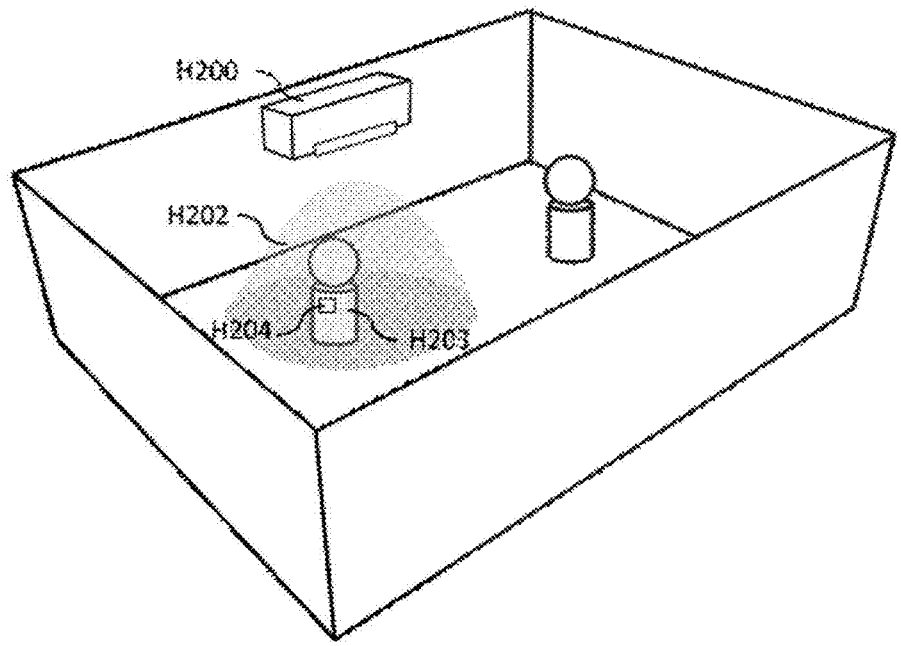
FIG. 11 is a schematic diagram explaining an example of acquisition of data on an air-conditioned region according to Embodiment 3.

FIG. 11 is a schematic diagram explaining an example of acquisition of data on the air-conditioned region according to Embodiment 3. In FIG. 11, H203 is an occupant staying in the air-conditioned region. H204 is a wearable terminal device. Examples of the wearable terminal device H204 include a device that the user can use by wearing around the wrist like a wristwatch, and a device that the user can use by wearing on the body. The wearable terminal device H204 is configured to transmit, for example, radio waves for communicating with another device. An indoor unit H200 performs air conditioning in the air-conditioned space, as with the case of the indoor unit 22 described in Embodiment 1. In addition, the indoor unit H200 is configured to receive radio waves transmitted from the wearable terminal device H204, determine the position of the wearable terminal device H204 in the air-conditioned space, and send a signal including data D7 of the terminal information to the air-conditioning apparatus control device 1. H202 is an air-conditioned region including the position of the wearable terminal device H204.

Figure 12:
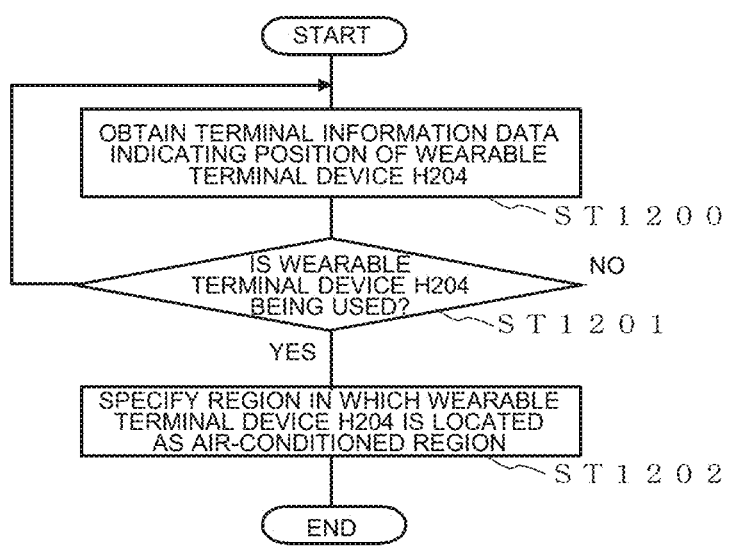
FIG. 12 is a diagram explaining an example of processing regarding a wearable terminal device H204, of the air-conditioning apparatus control device 1 according to Embodiment 3.

FIG. 12 is a diagram explaining an example of processing regarding the wearable terminal device H204, of the air-conditioning apparatus control device 1 according to Embodiment 3. First, in step ST1200, the terminal information acquisition unit 115 obtains data D7 of the terminal information indicating the position of the wearable terminal device H204. In step ST1201, based on the position of the wearable terminal device H204 in the data D7 of the terminal information obtained by the terminal information acquisition unit 115, the terminal usage determination unit 114 determines whether or not the occupant H203 is using the wearable terminal device H204. In step ST1201, when the terminal usage determination unit 114 determines that the wearable terminal device H204 is worn on the body and is being used, the terminal usage determination unit 114 sends data on the position of the wearable terminal device H204 to the target region specification unit 103. Then, in step ST1202, the target region specification unit 103 specifies a region in which the wearable terminal device H204 is located as the air-conditioned region based on the data on the position of the wearable terminal device H204 sent from the terminal usage determination unit 114.

Figure 13:
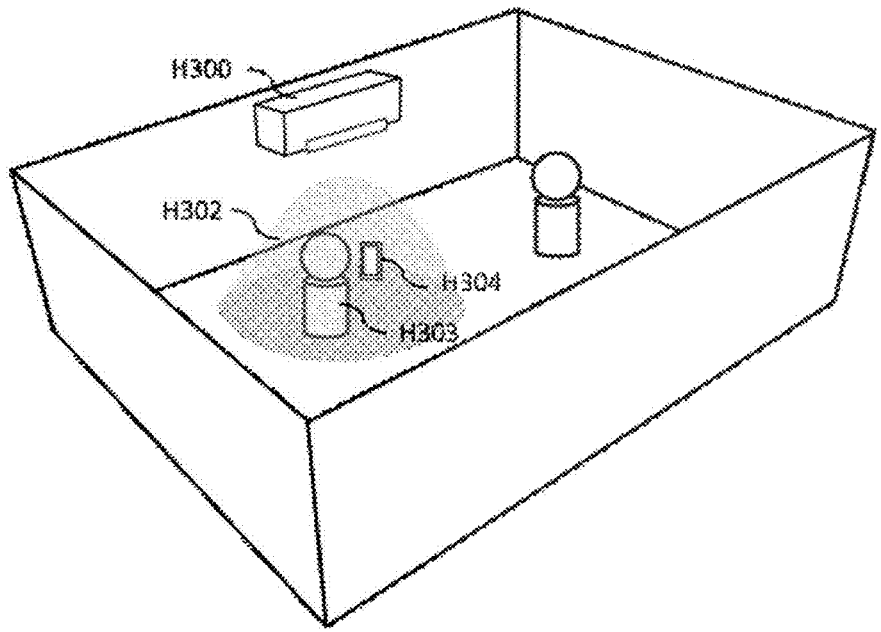
FIG. 13 is a schematic diagram explaining another example of acquisition of data on an air-conditioned region according to Embodiment 3.

FIG. 13 is a schematic diagram explaining another example of acquisition of data on the air-conditioned region according to Embodiment 3. In FIG. 13, H303 is an occupant staying in the air-conditioned region. H304 is a mobile terminal device, such as a mobile phone or a smartphone. The mobile terminal device H304 is configured to transmit, for example, radio waves for communicating with another device. An indoor unit H300 performs air conditioning in the air-conditioned space, as with the case of the indoor unit 22 described in Embodiment 1. In addition, the indoor unit H300 is configured to receive radio waves transmitted from the mobile terminal device H304, determine the position of the mobile terminal device H304 in the air-conditioned space, and send a signal including data D7 of the terminal information to the air-conditioning apparatus control device 1. H302 is an air-conditioned region including the position of the mobile terminal device H304.

Figure 14:
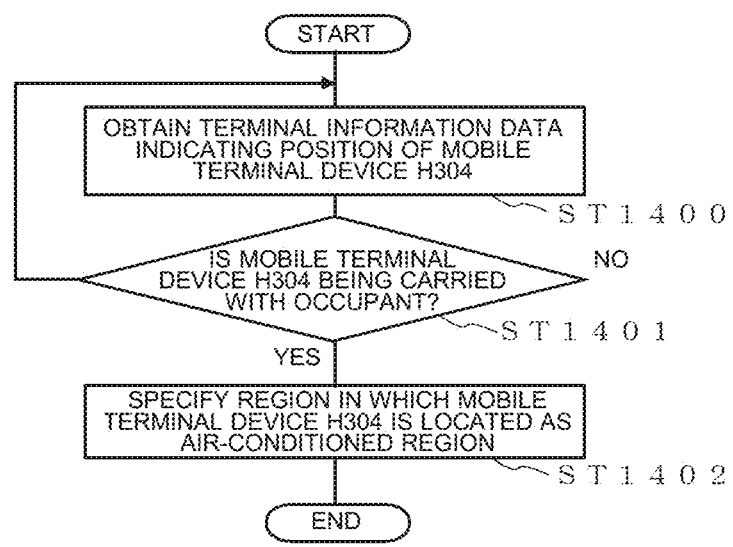
FIG. 14 is a diagram explaining an example of processing regarding a mobile terminal device H304, of the air-conditioning apparatus control device 1 according to Embodiment 3.

FIG. 14 is a diagram explaining an example of processing regarding the mobile terminal device H304, of the air-conditioning apparatus control device 1 according to Embodiment 3. First, in step ST1400, the terminal information acquisition unit 115 obtains data D7 of the terminal information indicating the position of the mobile terminal device H304. In step ST1401 based on the position of the mobile terminal device H304 obtained from the data D7 of the terminal information obtained by the terminal information acquisition unit 115, the terminal usage determination unit 114 determines whether or not the occupant H203 is carrying the mobile terminal device H304 with him/her. In step ST1401, when the terminal usage determination unit 114 determines that the mobile terminal device H304 is carried with the occupant H203, the terminal usage determination unit 114 sends data on the position of the mobile terminal device H304 to the target region specification unit 103. Then, in step ST1402, the target region specification unit 103 specifies the region in which the mobile terminal device H304 is located as the air-conditioned region based on the data on the position of the mobile terminal device H304 sent from the terminal usage determination unit 114.

Advantageous Effects of Embodiment 3

As described above, according to the air-conditioning apparatus control device 1 of Embodiment 3, the terminal usage determination unit 114 determines the position of the terminal device from the data D7 of the terminal information obtained by the terminal information acquisition unit 115. The target region specification unit 103 specifies the air-conditioned region based on the data on the position of the terminal device. As a result, the air-conditioning apparatus 2 can supply air-conditioned air to the occupant in the air-conditioned space in a more accurate manner. Thus, comfortableness of the occupant can be improved.

Embodiment 4

Figure 15:
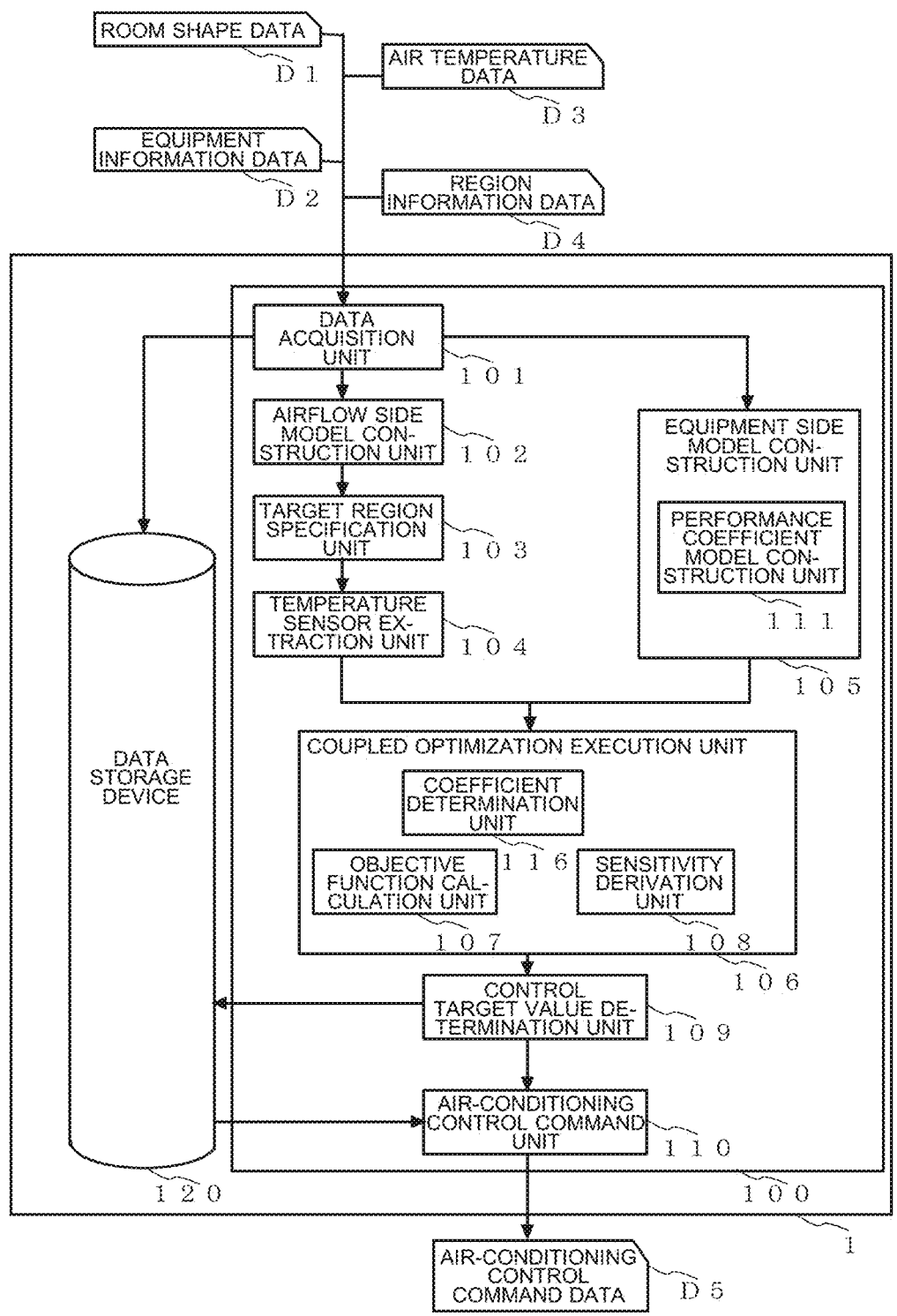
FIG. 15 is a diagram illustrating an example of the configuration of the air-conditioning apparatus control device 1 according to Embodiment 4.

FIG. 15 is a diagram illustrating an example of the configuration of the air-conditioning apparatus control device 1 according to Embodiment 4. A device in FIG. 15 denoted by the same reference sign as that in FIG. 2 performs the same processing as described in Embodiment 1. The air-conditioning apparatus control device 1 of Embodiment 4 includes a coefficient determination unit 116. The coefficient determination unit 116 determines a coefficient that the objective function calculation unit 107 of the coupled optimization execution unit 106 uses in calculation. Examples of the coefficient determined by the coefficient determination unit 116 include the coefficient ω of Formula (6) and the coefficients α and β of Formula (7), as described in Embodiment 1. The objective function calculation unit 107 of Embodiment 1 uses prescribed values as the coefficients. The objective function calculation unit 107 of Embodiment 4 uses, in calculation, a coefficient determined by the coefficient determination unit 116.

Figure 16:
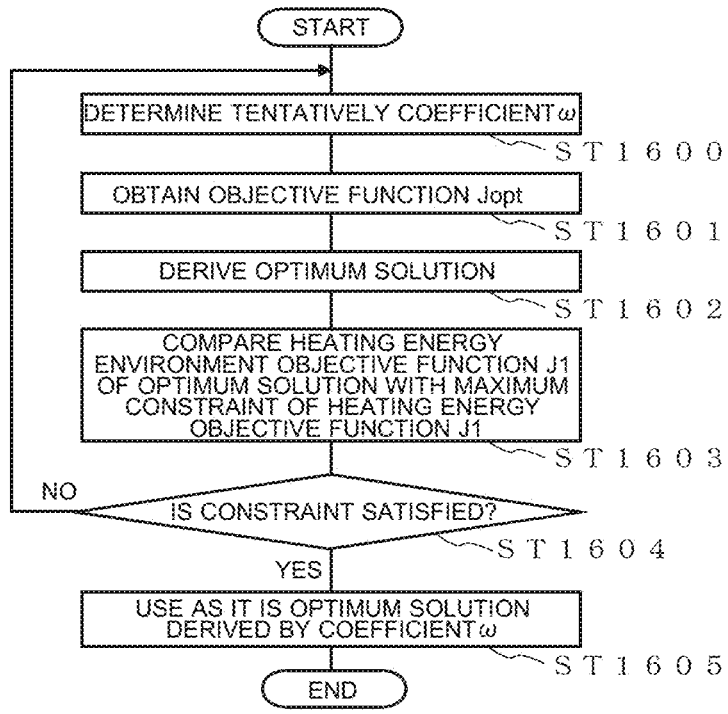
FIG. 16 is a diagram explaining an example of processing regarding determination of a coefficient w according to Embodiment 4.

FIG. 16 is a diagram explaining an example of processing regarding determination of the coefficient ω according to Embodiment 4. The determination of the coefficient ω will be explained based on the flowchart of FIG. 16. First, in step ST1600, the coefficient determination unit 116 determines tentatively the coefficient ω, which acts as a weight in the objective function of Formula (6). In this case, suppose that the coefficient ω is one. Next, in step ST1601, the objective function calculation unit 107 of the coupled optimization execution unit 106 calculates the heating energy environment objective function $J_1$ regarding heating energy environment in the air-conditioned space and the power objective function $J_2$ regarding power consumption amount of the air-conditioning apparatus based on Formulas (7) and (8). In addition, based on Formula (6), the objective function calculation unit 107 of the coupled optimization execution unit 106 calculates the objective function $J_{opt}$ by weighting by the coefficient ω determined by the coefficient determination unit 116.

Next, in step ST1602, the coupled optimization execution unit 106 derives an optimum solution based on the calculated objective function $J_{opt}$. Then, in step ST1603, the coupled optimization execution unit 106 compares the heating energy environment objective function $J_1$ regarding heating energy environment in the air-conditioned space in the obtained optimum solution with the maximum constraint regarding heating energy environment objective function $J_1$. In step ST1604, the coupled optimization execution unit 106 determines whether the constraint is satisfied. In step ST1605, when the coupled optimization execution unit 106 determines that the constraint is satisfied, the optimum solution derived by using the coefficient ω determined by the coefficient determination unit 116 is used as it is. Meanwhile, when the coupled optimization execution unit 106 determines that the constraint is not satisfied, the processing is returned to step ST1600 to perform processing for determining the coefficient ω. In this case, in step ST1600, the coefficient determination unit 116 sets the coefficient ω to a value smaller than the current value but equal to or greater than zero. Then, an optimum solution is obtained again. This processing is repeated until it is determined that the heating energy environment objective function $J_1$ satisfies the constraint.

Figure 17:
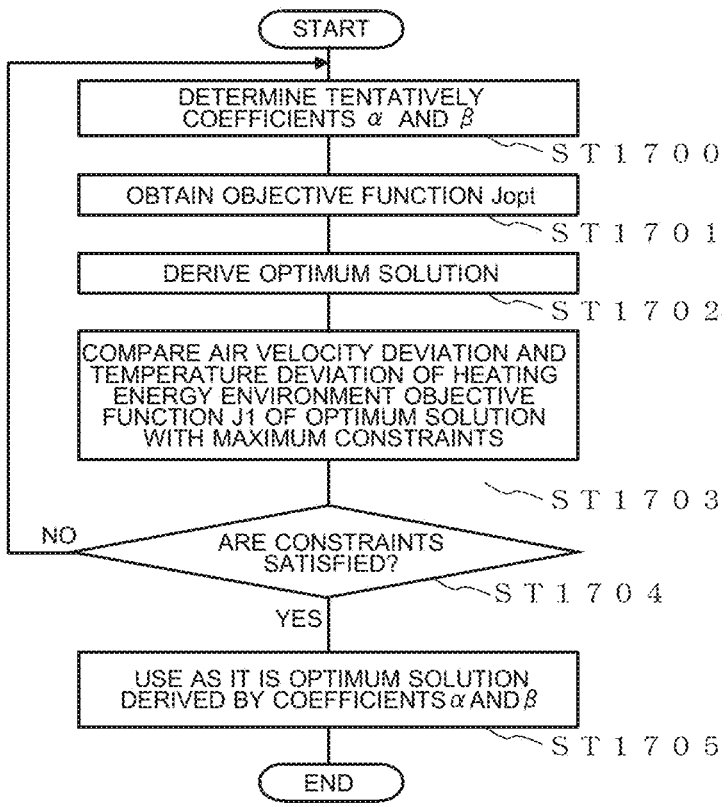
FIG. 17 is a diagram explaining an example of processing regarding determination of a coefficient α and a coefficient β according to Embodiment 4.

FIG. 17 is a diagram explaining an example of processing regarding determination of the coefficient α and the coefficient β according to Embodiment 4. The determination of the coefficient α and the coefficient β 13 will be explained based on the flowchart of FIG. 17. First, in step ST1700, the coefficient determination unit 116 determines tentatively the coefficients α and β, which act as weights for the respective terms in the heating energy environment objective function $J_1$ regarding heating energy environment in the air-conditioned space. In this case, suppose that each of the coefficients α and β is one. Next, in step ST1701, the objective function calculation unit 107 of the coupled optimization execution unit 106 calculates the heating energy environment objective function $J_1$ regarding heating energy environment in the air-conditioned space and the power objective function $J_2$ regarding power consumption amount of the air-conditioning apparatus based on Formulas (7) and (8). In addition, based on Formula (6), the objective function calculation unit 107 of the coupled optimization execution unit 106 calculates the objective function $J_{opt}$ by weighting by the coefficient ω determined by the coefficient determination unit 116.

Figure 18:
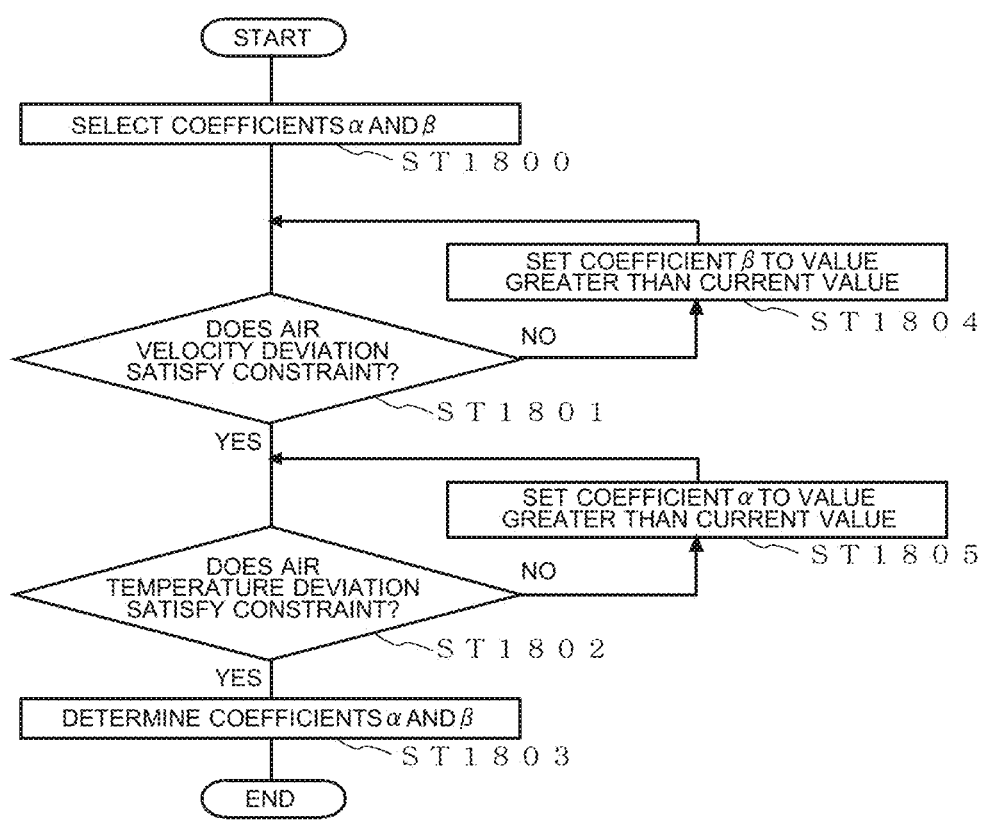
FIG. 18 is a diagram explaining an example of processing performed by a coefficient determination unit 116 according to Embodiment 4.

Next, in step ST1702, the coupled optimization execution unit 106 derives an optimum solution based on the calculated objective function $J_{opt}$. Then, in step ST1703, the coupled optimization execution unit 106 compares the constraints, which are the constraint of air velocity deviation and the constraint of temperature deviation, of the terms in the heating energy environment objective function $J_1$ regarding heating energy environment in the air-conditioned space in the obtained optimum solution with the respective maximum constraints. In step ST1705, when the coupled optimization execution unit 106 determines that the constraints are satisfied, the optimum solution derived by using the coefficients α and β determined by the coefficient determination unit 116 is used as it is. Meanwhile, when the coupled optimization execution unit 106 determines that the constraints are not satisfied, the processing is returned to step ST1700. In step ST1700, the coefficient determination unit 116 determines the coefficients α and β as illustrated in FIG. 18, which will be described later. Then, an optimum solution is obtained again by using the determined the coefficients α and β. This processing is repeated until it is determined that each term of the objective function regarding heating energy environment satisfies the constraint.

FIG. 18 is a diagram explaining an example of processing performed by the coefficient determination unit 116 according to Embodiment 4. The coefficient determination unit 116 performs the processing based on the flowchart shown in FIG. 18 to determine the coefficients α and β. In step ST1800, the coefficient determination unit 116 selects the coefficients α and β. In this case, each of the coefficients α and β is one, for example. In step ST1801, the coefficient determination unit 116 determines whether or not the term of the air velocity deviation in the heating energy environment objective function $J_1$ regarding heating energy environment satisfies the constraint. When the coefficient determination unit 116 determines that the term of the air velocity deviation does not satisfy the constraint, the coefficient determination unit 116 sets the coefficient β to a value greater than the current value in step ST1804. Then, the processing is returned to step ST1801 to perform the determination again.

Meanwhile, when it is determined that the term of the air velocity deviation satisfies the constraint, the coefficient determination unit 116 further determines whether or not the term of the temperature deviation in the heating energy environment objective function $J_1$ regarding heating energy environment satisfies the constraint in step ST1802. When the coefficient determination unit 116 determines that the term of the temperature deviation does not satisfy the constraint, the coefficient determination unit 116 sets the coefficient α to a value greater than the current value in step ST1805. Then, the processing is returned to step ST1802 to perform the determination again. When the coefficient determination unit 116 determines that the term of the temperature deviation satisfies the constraint, the coefficient determination unit 116 determines the coefficients α and β in step ST1803.

Advantageous Effects of Embodiment 4

As described above, according to the air-conditioning apparatus control device 1 of Embodiment 4, the coefficient determination unit 116 determines the coefficient ω that satisfies the heating energy environment objective function $J_1$ regarding heating energy environment in the air-conditioned space. Therefore, the optimum solution can be obtained that can meet the restriction for the comfortableness and can achieve energy saving. In addition, the coefficient determination unit 116 determines the coefficients α and β such that each term of the heating energy environment objective function $J_1$ regarding heating energy environment in the air-conditioned space is satisfied. Thus, the solution in which the air velocity deviation and the temperature deviation are taken into consideration can be selected.

Embodiment 5

Figure 19:
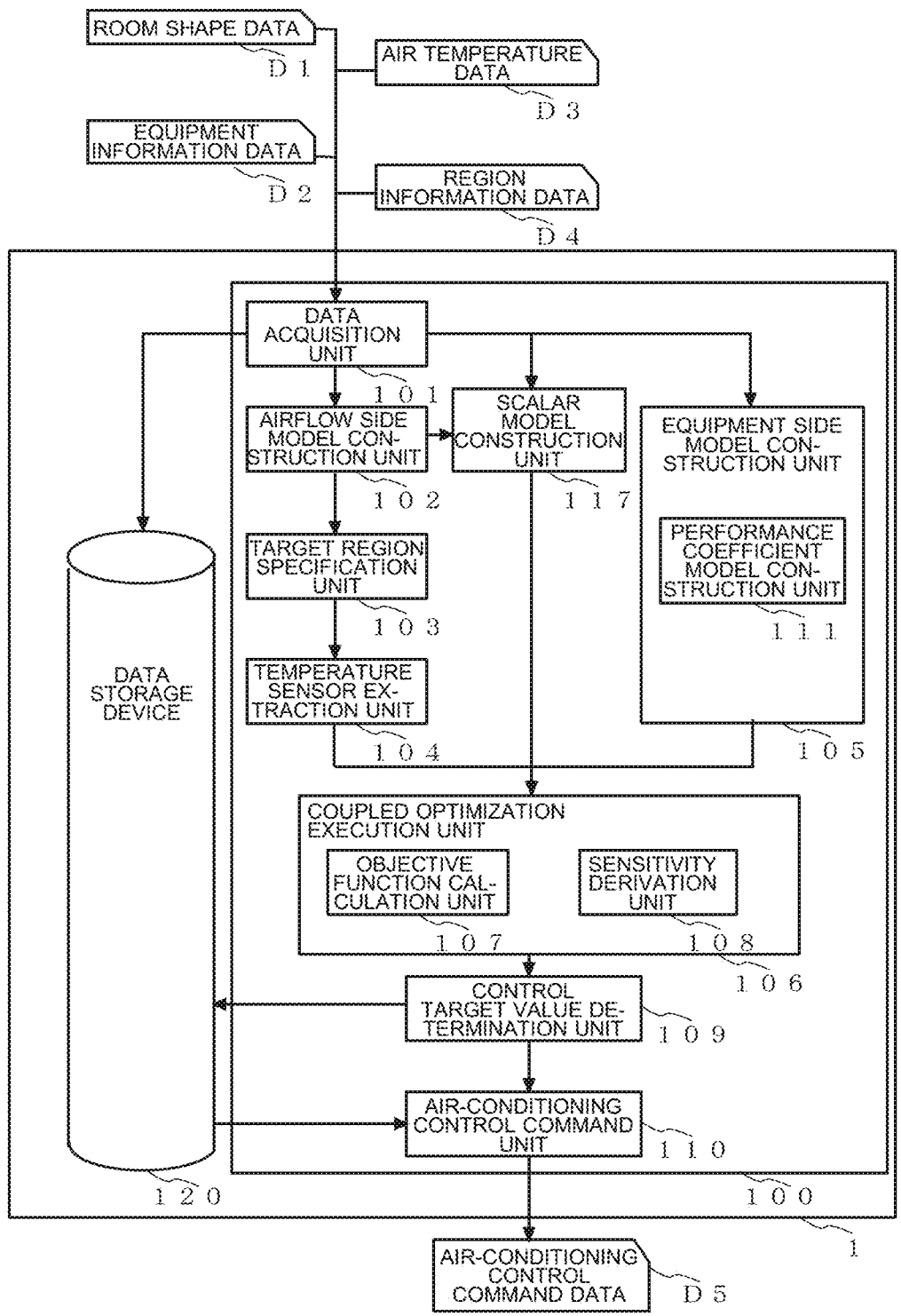
FIG. 19 is a diagram illustrating an example of the configuration of the air-conditioning apparatus control device 1 according to Embodiment 5.

FIG. 19 is a diagram illustrating an example of the configuration of the air-conditioning apparatus control device 1 according to Embodiment 5. A device in FIG. 19 denoted by the same reference sign as that in FIG. 2 performs the same processing as described in Embodiment 1. The air-conditioning apparatus control device 1 of Embodiment 5 includes a scalar model construction unit 117. The scalar model construction unit 117 is configured to perform calculation for a passive scalar distribution in the air-conditioned space. The passive scalar is a physical quantity, such as a concentration, that is transported and distributed by flow of a fluid without affecting the flow. Formula (17) is an example of a scalar equation. Here, c is the concentration of a passive scalar. Dc is a diffusion coefficient. d is a term for passive scalar generation.

[Formula 17]

$$c\frac{\partial u}{\partial x_i} = D_c \frac{\partial^2 c}{\partial x_i^2} + d \quad (17)$$

Furthermore, Formula (18) is an example of an objective function in a case where the scalar model construction unit 117 constructs a scalar distribution using a scalar model. Here, $J_3$ is an objective function based on the scalar model (hereinafter referred to as passive scalar objective function). γ is a coefficient for adjusting balance among the heating energy environment objective function $J_1$, the power objective function $J_2$, and the passive scalar objective function $J_3$. The coefficient γ may be a prescribed value or a value determined by the coefficient determination unit 116 described in Embodiment 4.

[Formula 18]

$$J_{opt} = J_1 + \omega \times J_2 + \gamma \times J_3 \quad (18)$$

Moreover, Formula (19) is a definition formula for the passive scalar objective function $J_3$.

[Formula 19]

$$J_3 = \int_D c^2 dV \quad (19)$$

Figure 20:
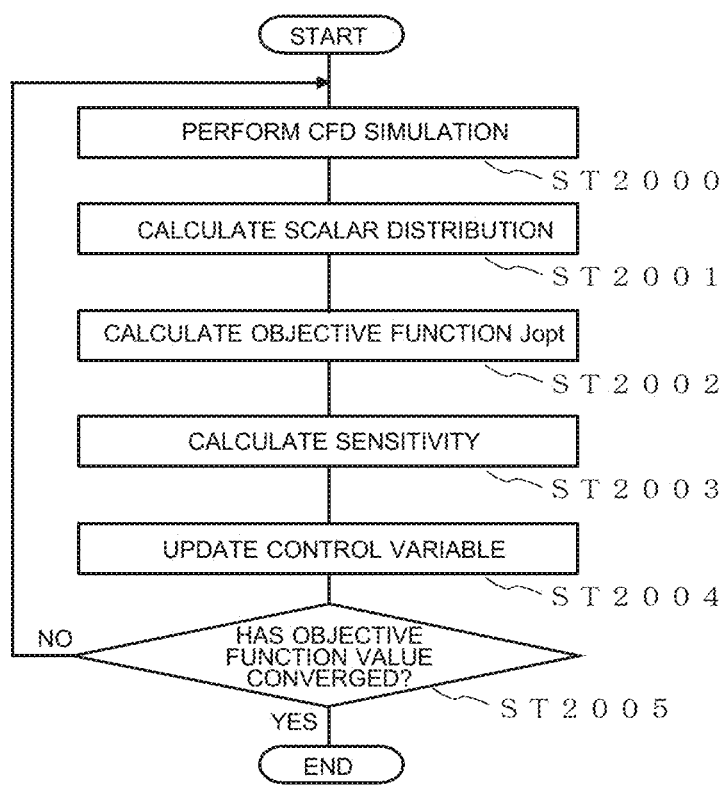
FIG. 20 is a diagram explaining an example of processing of the coupled optimization execution unit 106 and other units according to Embodiment 5.

FIG. 20 is a diagram explaining an example of processing of the coupled optimization execution unit 106 and other units according to Embodiment 5. The processing is explained based on the flowchart of FIG. 20. First, in step ST2000, the airflow side model construction unit 102 performs a CFD simulation by using the airflow side model constructed thereby. Then, in step ST2001, the scalar model construction unit 117 calculates a scalar distribution by using the scalar model constructed thereby. In step ST2002, the objective function calculation unit 107 derives a value of the previously set objective function. In step ST2003, the sensitivity derivation unit 108 derives sensitivity. In step ST2004, the coupled optimization execution unit 106 updates a design variable by using the derived sensitivity. Then, in step ST2005, the coupled optimization execution unit 106 performs convergence determination processing.

Advantageous Effects of Embodiment 5

As described above, according to the air-conditioning apparatus control device 1 of Embodiment 5, the scalar model construction unit 117 is provided for constructing a scalar model. When the coupled optimization execution unit 106 calculates the objective function including a passive scalar distribution, the concentration of dust or airborne droplet, which is regarded as a passive scalar distribution, can be reduced. Thus, a comfortable space is attained for the occupant staying in the air-conditioned space.

REFERENCE SIGNS LIST

1: air-conditioning apparatus control device, 2: air-conditioning apparatus, 4: sensor unit, 5: control network, 21: outdoor unit, 22: indoor unit, 23: remote controller, 41, 42: sensor, 100: control processor, 101: data acquisition unit, 102: airflow side model construction unit, 103: target region specification unit, 104: temperature sensor extraction unit, 105: equipment side model construction unit, 106: coupled optimization execution unit, 107: objective function calculation unit, 108: sensitivity derivation unit, 109: control target value determination unit, 110: air-conditioning control command unit, 111: performance coefficient model construction unit, 112: image acquisition unit, 113: figure determination unit, 114: terminal usage determination unit, 115: terminal information acquisition unit, 116: coefficient determination unit, 117: scalar model construction unit, 120: data storage device, D1: room shape data, D2: equipment information data, D3: air temperature data, D4: region information data, D5: air-conditioning control command data, D6: image data, D7: terminal information data, H101: imaging sensor, H200, H300: indoor unit, H203: occupant, H204: wearable terminal device, H304: mobile terminal device

The invention claimed is:

1. An air-conditioning apparatus control device configured to control an air-conditioning apparatus performing air conditioning in an air-conditioned space, comprising:
    airflow side model construction circuitry configured to construct an airflow side model for simulating a heating energy environment in the air-conditioned space;
    equipment side model construction circuitry configured to construct an equipment side model for simulating a restriction of behavior of a device that the air-conditioning apparatus has and for simulating a capacity of the device;
    coupled optimization execution circuitry having objective function calculation circuitry that is configured to calculate a value of an objective function for the air-conditioned space and configured to determine a coefficient that weights the objecting function based on the equipment side model for the objective function based on the airflow side model, and sensitivity derivation circuitry that derives sensitivity, which is change in the objective function when a control variable is changed, the coupled optimization execution circuitry being configured to calculate an optimum solution by optimizing the objective function based on the airflow side model and the objective function based on the equipment side model by using an inverse analysis method;
    control target value determination circuitry configured to determine a control target value for the air-conditioning apparatus from the optimum solution; and
    an air-conditioning control command circuitry configured to cause an actual temperature in the air-conditioned space to follow the control target value.

2. The air-conditioning apparatus control device of claim 1, further comprising:
    target region specification circuitry configured to specify an air-conditioned region in which air conditioning is performed within the air-conditioned space; and
    temperature sensor extraction circuitry configured to extract, from a plurality of temperature sensors installed in the air-conditioned space, a temperature sensor detecting a temperature in which the heating energy environment of the air-conditioned region is reflected, wherein the objective function calculation circuitry is configured to calculate a value of the objective function for the air-conditioned region in the air-conditioned space.

3. The air-conditioning apparatus control device of claim 2, further comprising:
figure determination circuitry configured to detect a position of a human figure in the air-conditioned space,
wherein the target region specification circuitry specifies the position of the human figure detected by the figure determination circuitry as the air-conditioned region.

4. The air-conditioning apparatus control device of claim 2, further comprising:
terminal information acquisition circuitry configured to detect a position of a terminal device located in the air-conditioned space,
wherein the target region specification circuitry specifies the position of the terminal device obtained by the terminal information acquisition circuitry as the air-conditioned region.

5. The air-conditioning apparatus control device of claim 1, further comprising:
scalar model construction circuitry configured to construct a scalar model using a passive scalar distribution,
wherein the objective function calculation circuitry is configured to calculate the objective function including the scalar model.

6. The air-conditioning apparatus control device of claim 2, further comprising:
scalar model construction circuitry configured to construct a scalar model using a passive scalar distribution,
wherein the objective function calculation circuitry is configured to calculate a value of the objective function including the scalar model.

7. The air-conditioning apparatus control device of claim 3, further comprising:
scalar model construction circuitry configured to construct a scalar model using a passive scalar distribution circuitry,
wherein the objective function calculation circuitry is configured to calculate a value of the objective function including the scalar model.

8. The air-conditioning apparatus control device of claim 4, further comprising:
scalar model construction circuitry configured to construct a scalar model using a passive scalar distribution,
wherein the objective function calculation circuitry calculates a value of the objective function including the scalar model.

9. An air-conditioning apparatus control device configured to control an air-conditioning apparatus performing air conditioning in an air-conditioned space, comprising:
airflow side model construction circuitry configured to construct an airflow side model for simulating a heating energy environment in the air-conditioned space;
equipment side model construction circuitry configured to construct an equipment side model for simulating a restriction of behavior of a device that the air-conditioning apparatus has and for simulating a capacity of the device;
scalar model construction circuitry configured to construct a scalar model using a passive scalar distribution;
coupled optimization execution circuitry having objective function calculation circuitry that is configured to calculate a value of an objective function including the scalar model for the air-conditioned space and sensitivity derivation circuitry that derives sensitivity, which is change in the objective function when a control variable is changed, the coupled optimization execution circuitry being configured to calculate an optimum solution by optimizing the objective function based on the airflow side model and the objective function based on the equipment side model by using an inverse analysis method;
control target value determination circuitry configured to determine a control target value for the air-conditioning apparatus from the optimum solution; and
an air-conditioning control command circuitry configured to cause an actual temperature in the air-conditioned space to follow the control target value.

* * * * *